(12) United States Patent
Yen et al.

(10) Patent No.: US 8,723,497 B2
(45) Date of Patent: May 13, 2014

(54) CONSTANT-ON-TIME GENERATION CIRCUIT AND BUCK CONVERTER

(75) Inventors: Tzu-Yang Yen, Taipei (TW); Chih-Yuan Chen, Hsinchu (TW)

(73) Assignee: Anpec Electronics Corporation, Hsinchu Science Park, Hsin-Chu (TW)

( * ) Notice: Subject to any disclaimer, the term of this patent is extended or adjusted under 35 U.S.C. 154(b) by 82 days.

(21) Appl. No.: 13/602,210

(22) Filed: Sep. 3, 2012

(65) Prior Publication Data

US 2013/0257403 A1  Oct. 3, 2013

(30) Foreign Application Priority Data

Mar. 28, 2012  (TW) .............................. 101110761 A

(51) Int. Cl.
*G05F 1/40*   (2006.01)

(52) U.S. Cl.
USPC ......................................... 323/283; 323/284

(58) Field of Classification Search
USPC ........................... 323/222, 225, 282–290, 351
See application file for complete search history.

(56) References Cited

U.S. PATENT DOCUMENTS

| | | | | |
|---|---|---|---|---|
| 5,481,178 | A * | 1/1996 | Wilcox et al. | 323/287 |
| 5,731,694 | A * | 3/1998 | Wilcox et al. | 323/287 |
| 5,994,885 | A * | 11/1999 | Wilcox et al. | 323/285 |
| 6,304,066 | B1 * | 10/2001 | Wilcox et al. | 323/282 |
| 6,580,258 | B2 * | 6/2003 | Wilcox et al. | 323/282 |
| 7,671,573 | B1 * | 3/2010 | Ling et al. | 323/283 |
| 8,018,209 | B2 * | 9/2011 | Kuo | 323/224 |
| 8,183,848 | B2 * | 5/2012 | Kuo | 323/285 |
| 8,334,682 | B2 * | 12/2012 | Chiu et al. | 323/282 |
| 2013/0051089 | A1 * | 2/2013 | Pan et al. | 363/21.17 |
| 2013/0099761 | A1 * | 4/2013 | Dong et al. | 323/271 |
| 2013/0207625 | A1 * | 8/2013 | Futamura | 323/271 |
| 2013/0207627 | A1 * | 8/2013 | Kahn et al. | 323/271 |
| 2013/0285634 | A1 * | 10/2013 | Bianco | 323/283 |

\* cited by examiner

*Primary Examiner* — Adolf Berhane
(74) *Attorney, Agent, or Firm* — Winston Hsu; Scott Margo

(57) ABSTRACT

A constant-on-time generation circuit for generating a turn-on signal to a buck is disclosed. The constant-on-time generation circuit includes a capacitor, a current source, a second resistor, an inverter, a transistor coupled to the inverter for generating a set turn-on signal according to a first front-end driver signal of the buck converter, a comparator including a negative input terminal coupled to a reference voltage, a positive input terminal coupled to the second resistor and the current source, and an output terminal, for comparing the reference voltage with the set turn-on signal to output a comparison result, and an SR-latch for outputting a turn-on signal to a driver stage circuit of the buck converter according to a trigger signal of the buck converter and the comparison result.

20 Claims, 7 Drawing Sheets

… … …

CONSTANT-ON-TIME GENERATION CIRCUIT AND BUCK CONVERTER

BACKGROUND OF THE INVENTION

1. Field of the Invention

The present invention relates to a constant-on-time generation circuit, and more particularly, to a constant-on-time generation circuit capable of compensating a turn-on delay time of a high-side switch of a buck converter.

2. Description of the Prior Art

Most electronic products, such as a laptop, a mobile phone, a personal digital assistant, a multimedia player and so on, require a power converter converting an alternate current source into a direct current source to provide a proper input voltage to ensure a normal operation of the electronic products. A buck converter is widely used since it has advantages of simple structure, easy design and low cost.

Please refer to FIG. 1, which is a schematic diagram of a buck converter 10 having a COT (Constant-on-time) control circuit. The buck converter 10 is used for converting an input voltage $V_{IN}$ to an output voltage $V_{OUT}$ to a load $R_{LOAD}$. The buck converter 10 includes a trigger signal generation circuit 101, a bootstrap circuit 102, an output stage circuit 103, a COT generation circuit 104 and a driver stage circuit 105. The trigger signal generation circuit 101 includes a comparator COMP' and resistors $R_{F1}$ and $R_{F2}$. The bootstrap circuit 102 includes a bootstrap capacitor $C_{BOOT}$ and a diode 107. The output stage circuit 103 includes an output inductor L, an effective serial resistor $R_{ESR}$ and an output capacitor $C_{OUT}$. The driver stage circuit 105 includes front-end drivers 106 and 108, a high-side switch HS and a low-side switch LS. Connection relations of above elements are shown in FIG. 1.

In operation, the comparator COMP' of the trigger signal generation circuit 101 outputs a trigger signal $C_{POUT}$ to the COT generation circuit 104 according to a trigger reference voltage $V_{REF}$ and a feedback voltage $V_{FB}$, wherein the output voltage $V_{OUT}$ is divided by the resistors $R_{F1}$ and $R_{F2}$ to obtain the feedback voltage $V_{FB}$ denoted as $$V_{FB} = \frac{R_{F1}}{R_{F1} + R_{F2}}.$$

The COT generation circuit 104 generates the turn-on signal $S_{TON}$ having a constant turn-on time $T_{ON}$ to the front-end driver 106 according to the trigger signal $C_{POUT}$, the output voltage $V_{OUT}$ and the input voltage $V_{IN}$. Moreover, when the high-side switch HS is turned on, a phase signal $S_{UGON}$ is equal to the input voltage $V_{IN}$, such that the COT generation circuit 104 may generate the turn-on signal $S_{TON}$ according to the trigger signal $C_{POUT}$, the output voltage $V_{OUT}$ and the phase signal $S_{UGON}$ as well. The front-end drivers 106 and 108 respectively generate a first front-end driver signal UG and a second front-end driver signal LG according to turn-on signal $S_{TON}$ and a bootstrap voltage $V_{BOOT}$ and the operating bias $V_{CC}$ to control when to turn on or off the high-side switch HS and the low-side switch LS. For example, the high-side switch HS is turned on and the low-side switch LS is turned off during the turn-on time $T_{ON}$; the high-side switch HS is turned off and the low-side switch LS is turned on during a turn-off time $T_{OFF}$. The turn-on time $T_{ON}$ is predetermined to be a constant, while the turn-off time $T_{OFF}$ is determined according to the feedback voltage $V_{FB}$, specifically, when the feedback voltage $V_{FB}$ is less than the trigger reference voltage $V_{REF}$, a switch duty cycle is triggered to start the next turn-on time $T_{ON}$.

However, in the buck converter 10, the high-side switch HS requires a higher drive voltage to be turned on and a longer response time compared to other electronic elements. In other words, when the turn-on $S_{TON}$ falls to a low voltage, the high-side switch HS may remain turned on for a while instead of turning off immediately, which causes a turn-on time $T_{ON}$, of the high-side switch HS to be longer than the predetermined turn-on time $T_{ON}$, i.e. $T_{ON}'=T_{ON}+\Delta T$, wherein $\Delta T$ is a delay time of the high-side switch HS.

A duty cycle D of the buck converter is defined to be a ratio of the output voltage $V_{OUT}$ and the input voltage VIN, i.e.

$$D = \frac{V_{OUT}}{V_{IN}},$$

furthermore, a switch frequency $F_{SW}$ is defined to be a ratio of the output voltage $V_{OUT}$ and the input voltage $V_{IN}$ per second, i.e.

$$F_{SW} = \frac{V_{OUT}}{V_{IN} * T_{ON}} = \frac{D}{T_{ON}}.$$

Due to the non-ideal delay time of the high-side switch HS, a real switch frequency $F_{SW}'$ may be denoted as:

$$F'_{SW} = \frac{D}{T_{ON} + \Delta T}.$$

Therefore, the delay time $\Delta T$ causes the real time $T_{ON}'$ to be different from the default turn-on time, such that the switch frequency $F_{SW}'$ of the buck converter is changed and does not provide the predetermined or correct switch frequency to the output load. Besides, in practice, the delay time $\Delta T$ also causes the switch frequency $F_{SW}'$ to change with the duty cycle D and a risk of abnormal power supply. Thus, there is a need to improve the prior art.

SUMMARY OF THE INVENTION

It is therefore an object of the present invention to provide a constant-on-time generation circuit and buck converter capable of compensating a turn-on delay time of a high-side switch of a buck converter.

The present invention discloses a constant-on-time generation circuit for generating a turn-on signal to a buck converter for converting an input voltage to an output voltage. The constant-on-time generation circuit comprises a capacitor, a current source having a transfer impedance and coupled to a first voltage for generating a current according to a first resistance of the transfer impedance and the first voltage, a second resistor coupled between the capacitor and the current source, an inverter coupled to a first front-end driver signal of the buck converter for inverting the first front-end driver signal, a transistor including a drain coupled to the capacitor, a source coupled to a ground terminal and a gate, for receiving the inverted first front-end driver signal to trigger the current source charging the capacitor so as to generate a set turn-on signal, a comparator including a negative input terminal coupled to a reference voltage, a positive input terminal coupled to the second resistor and the current source, and an output terminal, for comparing the reference voltage with the set turn-on signal to output a comparison result, and an SR-latch including a reset input terminal coupled to the output terminal of the comparator, and a set input terminal coupled to a trigger signal of the buck converter, for outputting a turn-on signal to a driver stage circuit of the buck converter according to the trigger signal and the comparison result.

The present invention further discloses a buck converter for converting an input voltage to an output voltage. The buck converter comprises a trigger signal generation circuit for outputting a trigger signal, a constant-on-time generation circuit including a capacitor, a current source having a transfer impedance and coupled to a first voltage for generating a current according to a first resistance of the transfer impedance and the first voltage, a second resistor coupled between the capacitor and the current source, an inverter coupled to a first front-end driver signal of the buck converter for inverting the first front-end driver signal, a transistor including a drain coupled to the capacitor, a source coupled to a ground terminal and a gate for receiving the inverted first front-end driver signal to trigger the current source charging the capacitor so as to generate a set turn-on signal, a comparator including a negative input terminal coupled to a reference voltage, a positive input terminal coupled to the second resistor and the current source, and an output terminal for comparing the reference voltage with the set turn-on signal to output a comparison result, and an SR-latch including a reset input terminal coupled to the output terminal of the comparator and a set input terminal coupled to the trigger signal, and an output terminal for outputting a turn-on signal to a driver stage circuit of the buck converter according to the trigger signal and the comparison result, a driver stage circuit coupled to the output terminal of the SR-latch for generating a phase signal according to the turn-on signal, and an output stage circuit for generating the output voltage to an output load according to the phase signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
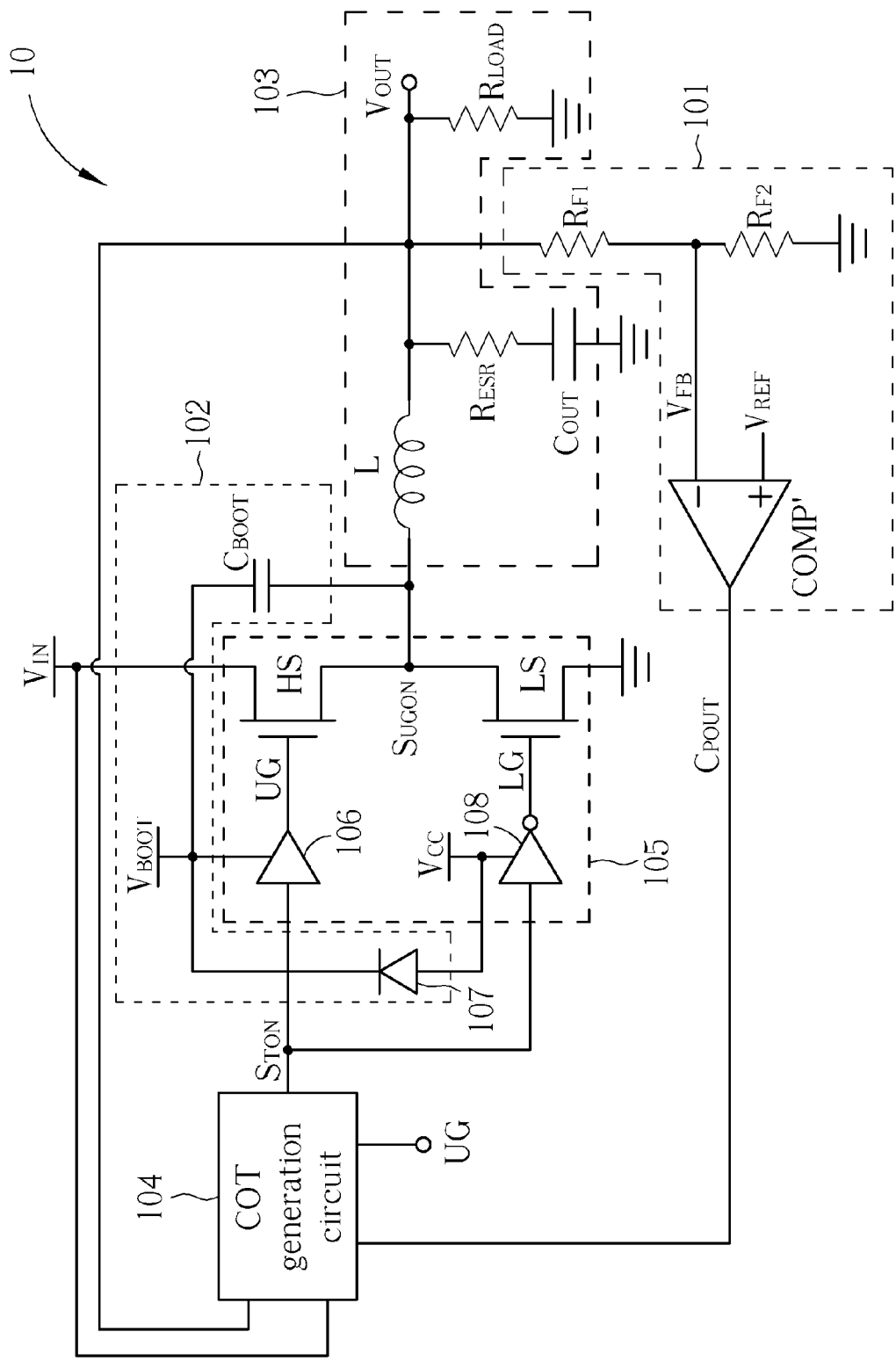
FIG. 1 is a schematic diagram of a traditional buck converter having a COT control circuit.
Figure 2:
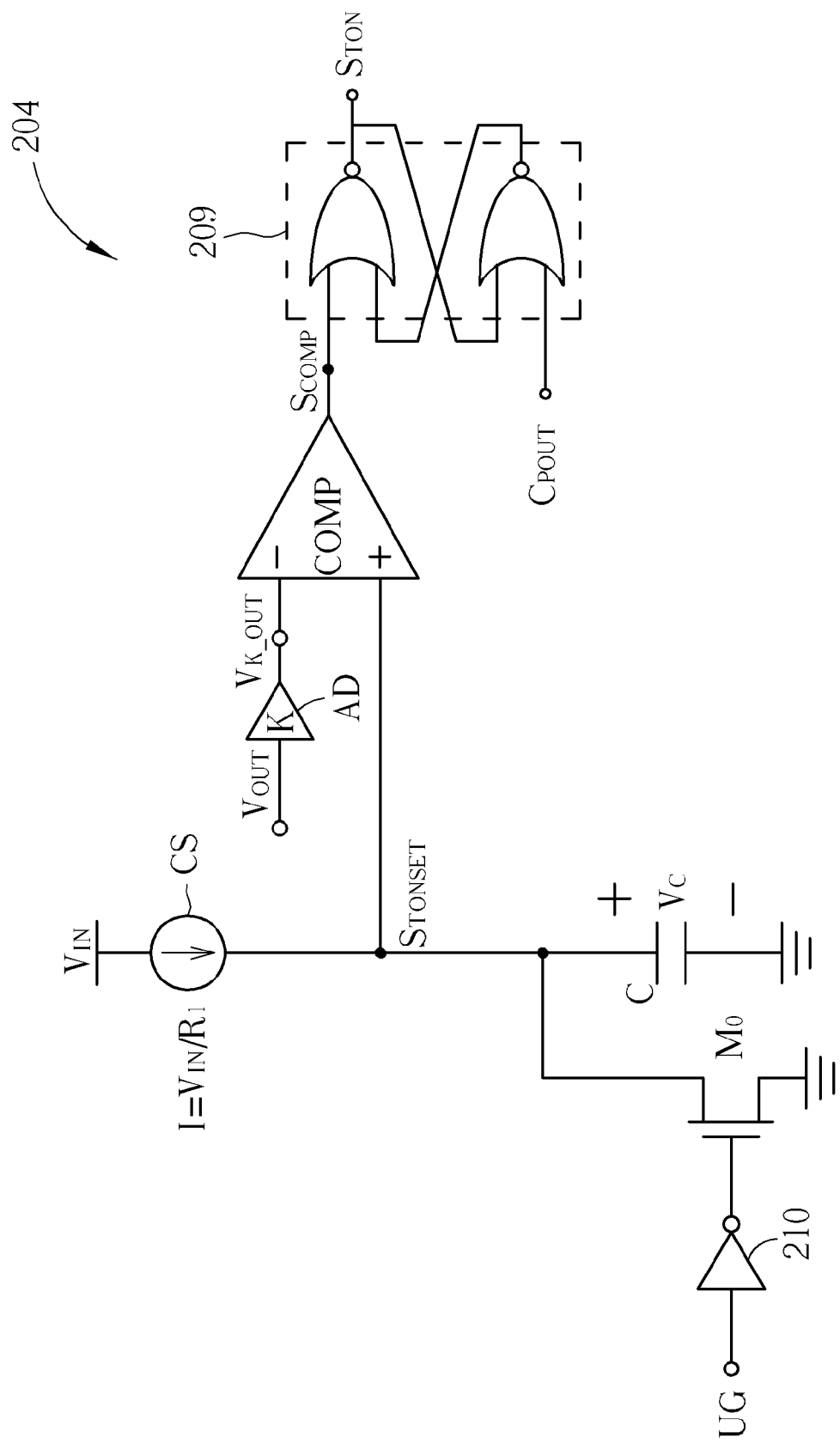
FIG. 2 is a schematic diagram of a COT generation circuit 204.

Please refer to FIG. 2, which is a schematic diagram of a COT generation circuit 204. The COT generation circuit 204 is used for the buck converter 10 to be substituted for the COT generation circuit 104 shown in FIG. 1. The COT generation circuit 204 includes a comparator COMP, a current source CS, a capacitor C, an SR-latch 209, an inverter 210 and a transistor $M_0$. As shown in FIG. 2, the current source CS is coupled to an input voltage, the capacitor C is cascaded between the current source CS and a ground terminal. The inverter 210 is coupled to a gate of the transistor $M_0$ for inverting the first front-end driver signal UG of the buck converter 10 to control the transistor $M_0$ to be turned on or off. The transistor $M_0$ is parallel to the capacitor C for controlling the current source CS to charge the capacitor C according to the inverted first front-end driver signal UG. A negative input terminal of the comparator COMP is coupled to a reference voltage $V_{K\_OUT}$, a positive input terminal is coupled between the capacitor C and the current source CS, such that the positive input terminal of the comparator COMP receives a cross voltage $V_C$ on the capacitor C as a set turn-on signal $S_{TONSET}$. Moreover, a voltage adjustment unit AD may be cascaded between the output voltage $V_{OUT}$ and positive input terminal of the comparator COMP for adjusting the output voltage $V_{OUT}$ to generate the reference voltage $V_{K\_OUT}$ denoted as $V_{K\_OUT}=K*V_{OUT}$, wherein K is an adjustment constant. The comparator COMP compares the reference voltage $V_{K\_OUT}$ with the set turn-on signal $S_{TONSET}$ to output a comparison result $S_{COMP}$. A reset input terminal of the SR-latch 209 is coupled to the output terminal of the comparator COMP, and a set input terminal is coupled to a trigger signal $C_{POUT}$ outputted from the trigger signal generation circuit 101, such that the SR-latch 209 outputs the turn-on signal $S_{TON}$ to the front-end driver 106 to turn on the high-side switch HS according to the comparison result $S_{COMP}$ and the trigger signal $C_{POUT}$.

In operation, when the high-side switch HS is turned off, the inverted first front-end driver signal UG is at a high voltage to turn on the transistor $M_0$, such that the capacitor C is shorted to the ground terminal and discharged, and the cross voltage $V_C$ and the set turn-on signal $S_{TONSET}$ are both set to zero voltage accordingly. The trigger signal $C_{POUT}$ may be an impulse signal, the turn-on signal $S_{TON}$ outputted by the SR-latch 209 is set to be at a high voltage once the impulse of trigger signal $C_{POUT}$ rises. The turn-on signal $S_{TON}$ is transferred to be the first front-end driver signal UG by the front-end driver 106 to turn on the high-side switch HS. Then, since the high-side switch HS is turned on, the inverted first front-end driver signal UG is at a low voltage (or zero voltage) to turn off the transistor $M_0$, such that the current source CS starts charging the capacitor C, and the cross voltage $V_C$ and the set turn-on signal $S_{TONSET}$ begin increasing until the first front-end driver signal UG turns on the transistor $M_0$ again, so the capacitor C is short to the ground terminal again. As a result, the capacitor C is periodically charged and discharged to generate the set turn-on signal $S_{TONSET}$ having a triangle waveform. In other words, the current source CS and the capacitor C are cascaded to form a voltage integrator, and the transistor $M_0$ triggers the voltage integrator to start performing integration according to the first front-end driver signal UG.

When the reference voltage $V_{K\_OUT}$ is greater than the set turn-on signal $S_{TONSET}$, the comparator COMP outputs the comparison result $S_{COMP}$ at a low voltage. Meanwhile, the set and reset input terminals of the SR-latch 209 are both at a low voltage, such that the turn-on signal $S_{TON}$ outputted by the SR-latch 209 remains at a high voltage. When the reference voltage $V_{K\_OUT}$ is less than the set turn-on signal $S_{TONSET}$, the comparator COMP outputs the comparison result $S_{COMP}$ at a high voltage. At this moment, the reset input terminal of the SR-latch 209 is at a high voltage, such that the turn-on signal $S_{TON}$ outputted by the SR-latch 209 turns to be at a low voltage to turn off the high-side switch HS. Therefore, the turn-on signal $S_{TON}$, which has a square waveform, periodically turns on and off the high-side switch HS to generate the first front-end driver signal UG.

In a viewpoint of circuit analysis, a relation between the capacitor C and a charge current I may be written as $$I = C * \frac{dV_C}{dT},$$

wherein the current I is generated by the current source CS and may be written as $$I = \frac{V_{IN}}{R_1}.$$

Assume a charge time of the capacitor C is equal to the turn-on time $T_{ON}$, which may be written as:

$$T_{ON} = C * \frac{dV_C}{I} = C\frac{(K * V_{OUT}) - 0}{\frac{V_{IN}}{R_1}} = K * R_1 * C * \frac{V_{OUT}}{V_{IN}} \quad (1)$$

Besides, the duty cycle D of the buck converter 10 is $$D = \frac{V_{OUT}}{V_{IN}},$$

and the switch frequency $F_{SW}$ of the buck converter 10 is:

$$F_{SW} = \frac{V_{OUT}}{V_{IN} * T_{ON}} \quad (2)$$

Substitute the duty cycle D into formula (2) to obtain the switch frequency $F_{SW}$:

$$F_{SW} = \frac{V_{OUT}}{V_{IN} * T_{ON}} = \frac{D}{T_{ON}} \quad (3)$$

Substitute formula (1), i.e. the turn-on time $T_{ON}$, into formula (3) and rearrange to obtain the ideal switch frequency $F_{SW}$:

$$F_{SW} = \frac{D}{K * R_1 * C * \frac{V_{OUT}}{V_{IN}}} = \frac{1}{K * R_1 * C} \quad (4)$$

As can be seen from formula (4), the ideal switch frequency $F_{SW}$ may be determined by a duty frequency $$\frac{1}{R_1 C}$$

of the COT generation circuit 204, wherein the constant K is used for adjusting the switch frequency $F_{SW}$ according to different practical requirements.

Figure 3:
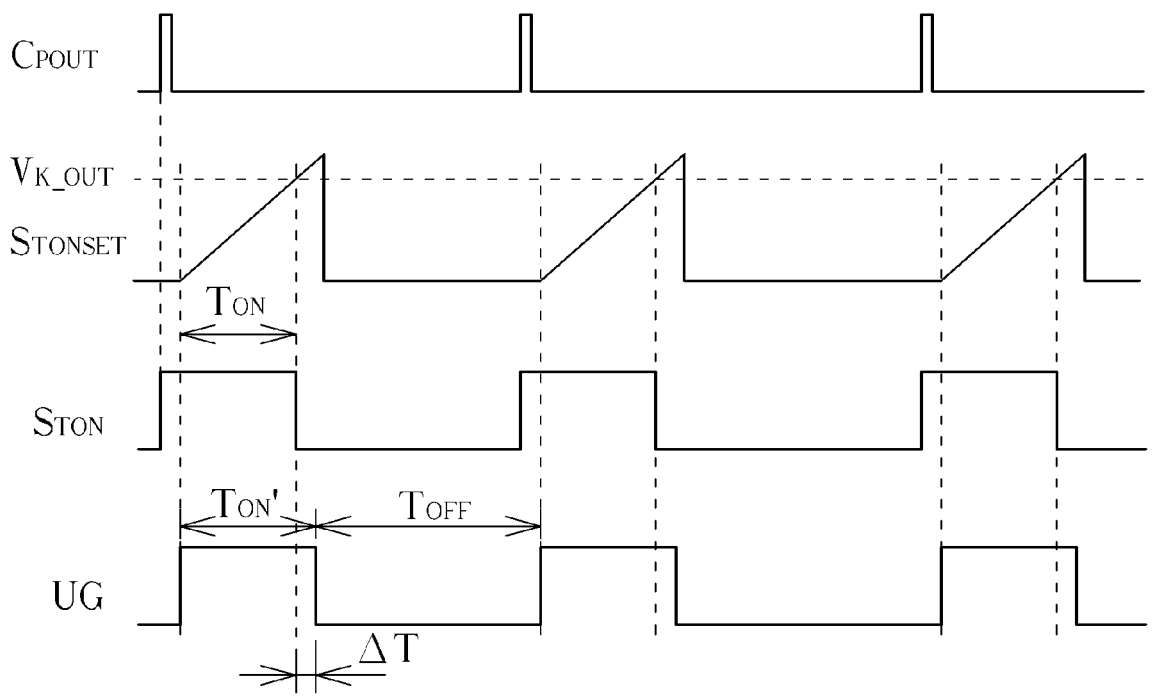
FIG. 3 is a schematic diagram of waveforms of the trigger signal, the reference voltage, the set turn-on signal, the turn-on signal and the first front-end driver signal shown in FIG. 2.

Please refer to FIG. 3, which is a schematic diagram illustrating waveforms of the trigger signal $C_{POUT}$, the reference voltage $V_{K\_OUT}$, the set turn-on signal $S_{TONSET}$, the turn-on signal $S_{TON}$ and the first front-end driver signal UG shown in FIG. 2. As shown in FIG. 3, the trigger signal $C_{POUT}$ rises to pull the turn-on signal $S_{TON}$ to be at a high voltage until the set turn-on signal $S_{TONSET}$ is greater than the reference voltage $V_{K\_OUT}$. When the first front-end driver signal UG rises to be at a high voltage, the set turn-on signal $S_{TONSET}$ starts increasing until the first front-end driver signal UG falls to be at a low voltage, and the set turn-on signal $S_{TONSET}$ is reset by the first front-end driver signal UG to be at a low voltage. The turn-on time $T_{ON}$ is a time starting from a rising edge of the first front-end driver signal UG to a falling edge of the turn-on signal $S_{TON}$, and the first front-end driver signal UG is supposed to fall to be at a low voltage once the turn-on signal $S_{TON}$ falls. However, the high-side switch HS has a delayed response, which leads to the real turn-on time $T_{ON}'$ of the high-side switch HS includes a delay time $\Delta T$, i.e. $T_{ON}' = T_{ON} + \Delta T$. When the turn-on signal $S_{TON}$ has fallen to a low voltage, the first front-end driver signal UG is still at a high voltage. Thus, the substitute formula (1) into the turn-on time $T_{ON}'$ to obtain the following formula (5):

$$T_{ON}' = K * R_1 * C * D + \Delta T \quad (5)$$

And the real switch frequency $F_{SW}'$ is:

$$F_{SW}' = \frac{D}{T_{ON}'} = \frac{D}{K * R_1 * C * D + \Delta T} \quad (6)$$

As can be seen form formula (6), if the K, $R_1$, C are constant and the duty cycle D is variant, the non-ideal delay time $\Delta T$ causes the real switch frequency $F_{SW}'$ of the buck converter 10 varies as the duty cycle D varies.

Figure 4:
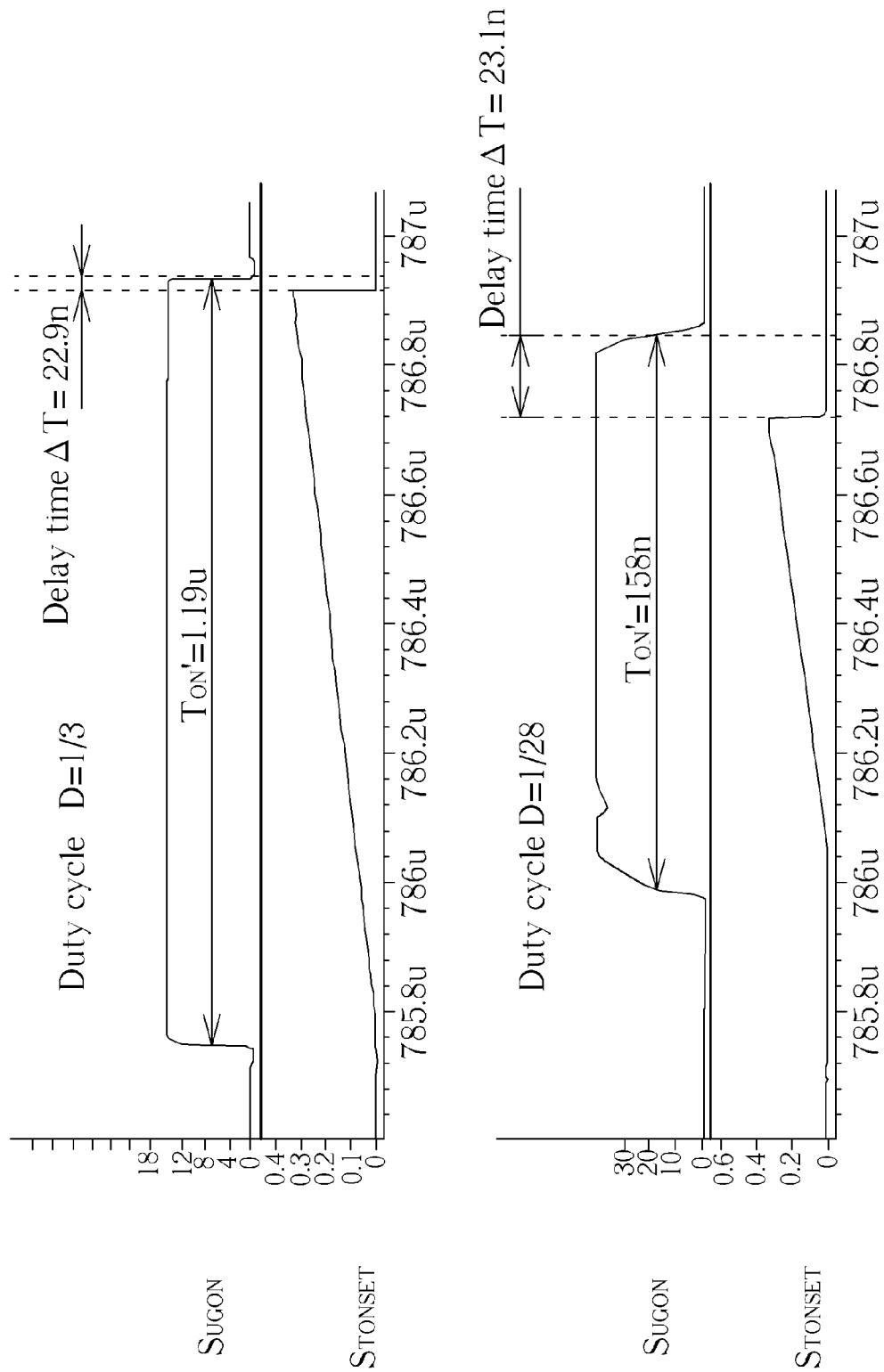
FIG. 4 is a schematic diagram of a waveform of the phase signal corresponding to different duty cycles.

Please refer to FIG. 4, which is a simulated waveform of the phase signal $S_{UGON}$ corresponding to different duty cycles D. In FIG. 4, when the duty cycle D is $$\frac{1}{3},$$

the real turn-on time $T_{ON}'$ is 1.19μ seconds and the delay time $\Delta T$ of the high-side switch HS is 22.9 n seconds, so the delay time $\Delta T$ takes 1.92% of the turn-on time $T_{ON}'$. In comparison, when the duty cycle D is $$\frac{1}{28},$$

the real turn-on time $T_{ON}'$ is 158n seconds and the delay time $\Delta T$ of the high-side switch HS is 23.1n seconds, so the delay time $\Delta T$ takes 14.62% of the turn-on time $T_{ON}'$. As a result, the delay time $\Delta T$ is substantially a constant, the lower the duty cycle D, the more significant influence the delay time $\Delta T$ is to the turn-on time $T_{ON}'$. In the low duty cycle D, the buck converter 10 may not be able to provide a sufficient power efficiency to the load due to its low switch frequency $F_{SW}'$.

Therefore, in order to compensate the delay time $\Delta T$, the present invention further provides a COT generation circuit, by increasing a start-voltage of the set turn-on signal $S_{TONSET}$, the set turn-on signal $S_{TONSET}$ may reach the reference voltage $V_{K\_OUT}$ in advance to compensate for the delay time $\Delta T$ of the high-side switch HS.

Figure 5:
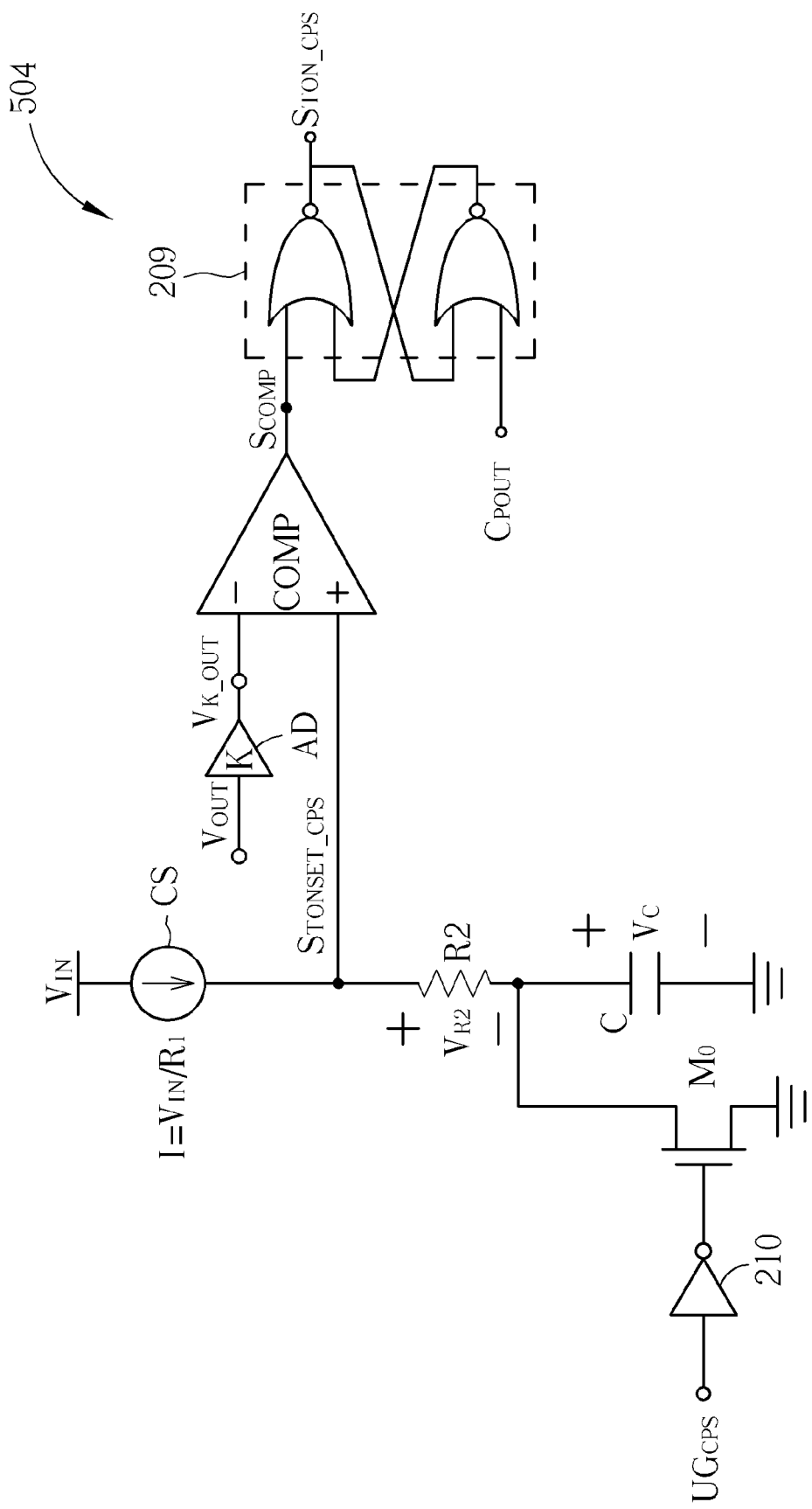
FIG. 5 is a schematic diagram of a COT generation circuit according to an embodiment of the present invention.

Please refer to FIG. 5, which is a schematic diagram of a COT generation circuit 504 according to an embodiment of the present invention. The COT generation circuit 504 is similar to the COT generation circuit 204 shown in FIG. 2 and the same elements are denoted with the same symbols for simplicity. A difference between the COT generation circuits 204 and 504 is the COT generation circuits 504 further includes a resistor $R_2$ cascaded between the current source CS and the capacitor C. When the first front-end driver signal UG controls the current source CS to charge the capacitor C, the current I flows through the resistor $R_2$ to generate a cross voltage $V_{R2}$ on the resistor $R_2$. In such a structure, a set turn-on signal $S_{TONSET\_CPS}$ starts increasing from the cross voltage $V_{R2}$, and the comparator COMP outputs the comparison result $S_{COMP}$ at a low voltage when the set turn-on signal $S_{TONSET\_CPS}$ is less than the reference voltage $V_{K\_OUT}$. Until the set turn-on signal $S_{TONSET\_CPS}$ reaches the reference voltage $V_{K\_OUT}$, the comparator COMP outputs the comparison result $S_{COMP}$ at a high voltage to the reset terminal of the SR-latch 209, such that the SR-latch 209 outputs the turn-on signal $S_{TON\_CPS}$ to turn off the high-side switch HS. As a result, a time that the set turn-on signal $S_{TONSET\_CPS}$ reaching the reference voltage $V_{K\_OUT}$ may be shorten, such that the SR-latch 209 resets the turn-on signal $S_{TON\_CPS}$ in advance, i.e. the turn-on signal $S_{TON\_CPS}$ falls from a high voltage to a low voltage in advance. As a result, the high-side switch HS may be notified to turn off in advance to be turned off on the right time after the response or delay time $\Delta T$. By properly selecting a resistance of the resistor $R_2$, a time that the turn-on signal $S_{TON\_CPS}$ is shortened may be substantially equal to the delay time $\Delta T$, so as to compensate the delay time $\Delta T$, and thus improve the problem of the duty cycle D influencing the switch frequency $F_{SW}'$.

In the viewpoint of circuit analysis, since the resistor $R_2$ are included in the COT generation circuit 504 to compensate for the delay time $\Delta T$, a compensated turn-on time $T_{ON\_CPS}$ may be written as:

$$T_{ON\_CPS} = C * \left( \frac{K * V_{OUT} - V_{R2}}{I} \right) + \Delta T \quad (7)$$

Substitute $$V_{R2} = R_2 * I, \quad I = \frac{V_{IN}}{R_1}, \quad D = \frac{V_{OUT}}{V_{IN}}$$

into formula (7) and rearrange formula (7) to obtain:

$$T_{ON\_CPS} = C * \left( \frac{K * V_{OUT} - R_2 * \frac{V_{IN}}{R_1}}{\frac{V_{IN}}{R_1}} \right) + \Delta T$$
$$= K * R_1 * C * D - [(R_2 * C) - \Delta T]$$

Assume $\Delta T = R_2 * C$, so the turn-on time $T_{ON\_CPS}$ may be written as:

$$T_{ON\_CPS} = K * D * R_1 * C \quad (8)$$

And a compensated switch frequency $F_{SW\_CPS}$ may be written as:

$$F_{SW\_CPS} = \frac{D}{T_{ON\_CPS}} = \frac{1}{K * R_1 * C} \quad (9)$$

As a result, as can be seen from formulas (8) and (9), the compensated turn-on time $T_{ON\_CPS}$ is equal to the ideal turn-on time $T_{ON}$, and the compensated switch frequency $F_{SW\_CPS}$ is equal to the ideal switch frequency $F_{SW}$ as well, and thus the non-ideal switch frequency $F_{SW}'$ influenced by the duty cycle D is improved.

Figure 6:
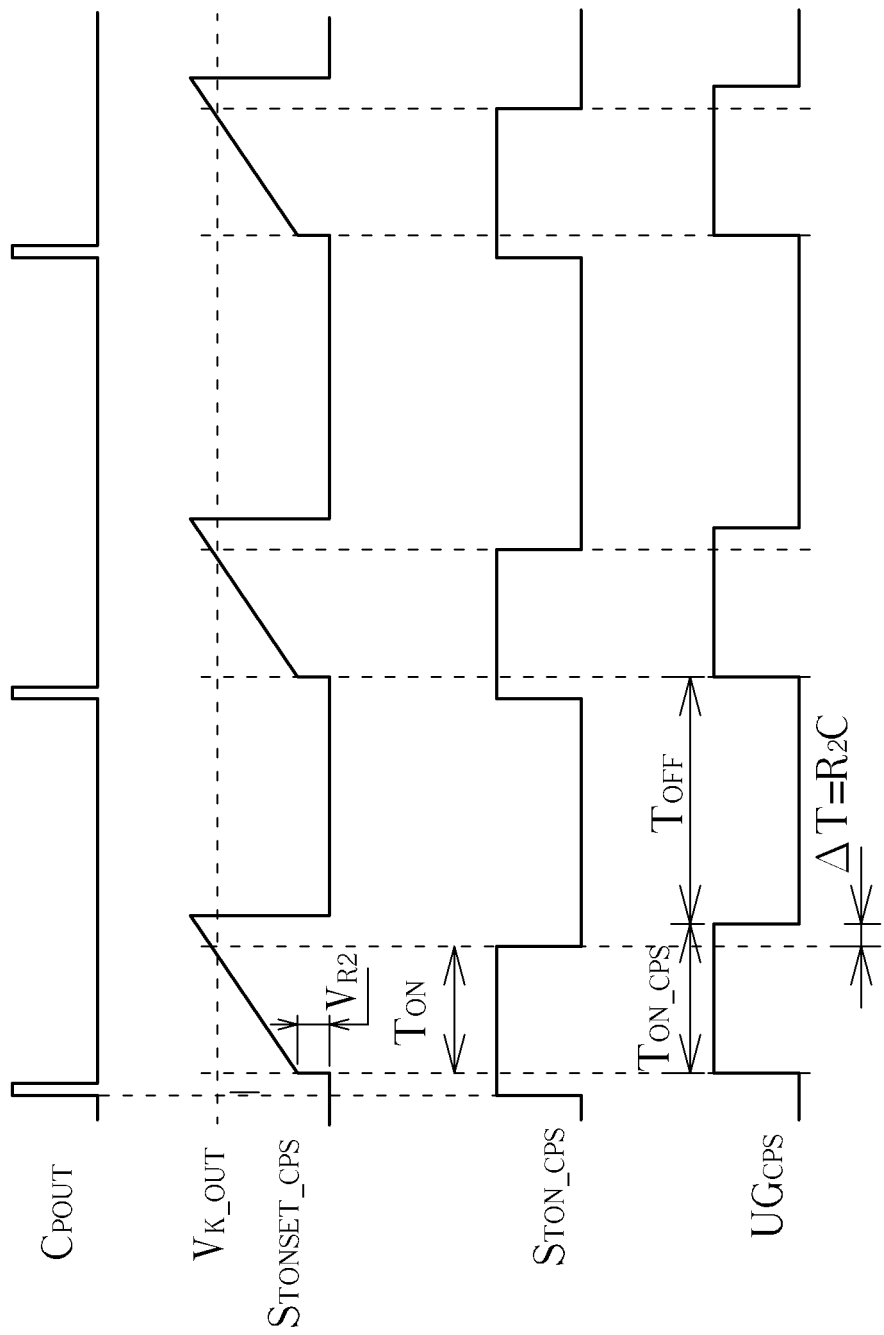
FIG. 6 is a schematic diagram of waveforms of the trigger signal, the reference voltage, the set turn-on signal, the turn-on signal and a first front-end driver signal shown in FIG. 5.

Please refer to FIG. 6, which is a schematic diagram illustrating waveforms of the trigger signal $C_{POUT}$, the reference voltage $V_{K\_OUT}$, the set turn-on signal $S_{TONSET\_CPS}$, the turn-on signal $S_{TON\_CPS}$ and a first front-end driver signal $UG_{CPS}$ shown in FIG. 5. As shown in FIG. 6, when the current source CS starts charging the capacitor C, the set turn-on signal $S_{TONSET\_CPS}$ starts increasing from the cross voltage $V_{R2}$, which shortens the time the set turn-on signal $S_{TONSET\_CPS}$ needs to reach the reference voltage $V_{K\_OUT}$, and the time the turn-on signal $S_{TON}$ turns on the high-side switch HS may be shortened accordingly. The time that the turn-on signal $S_{TON\_CPS}$ is shortened may be substantially equal to the delay time $\Delta T$ by properly selecting the resistance of the resistor $R_2$ and the capacitance of the capacitor C.

Figure 7:
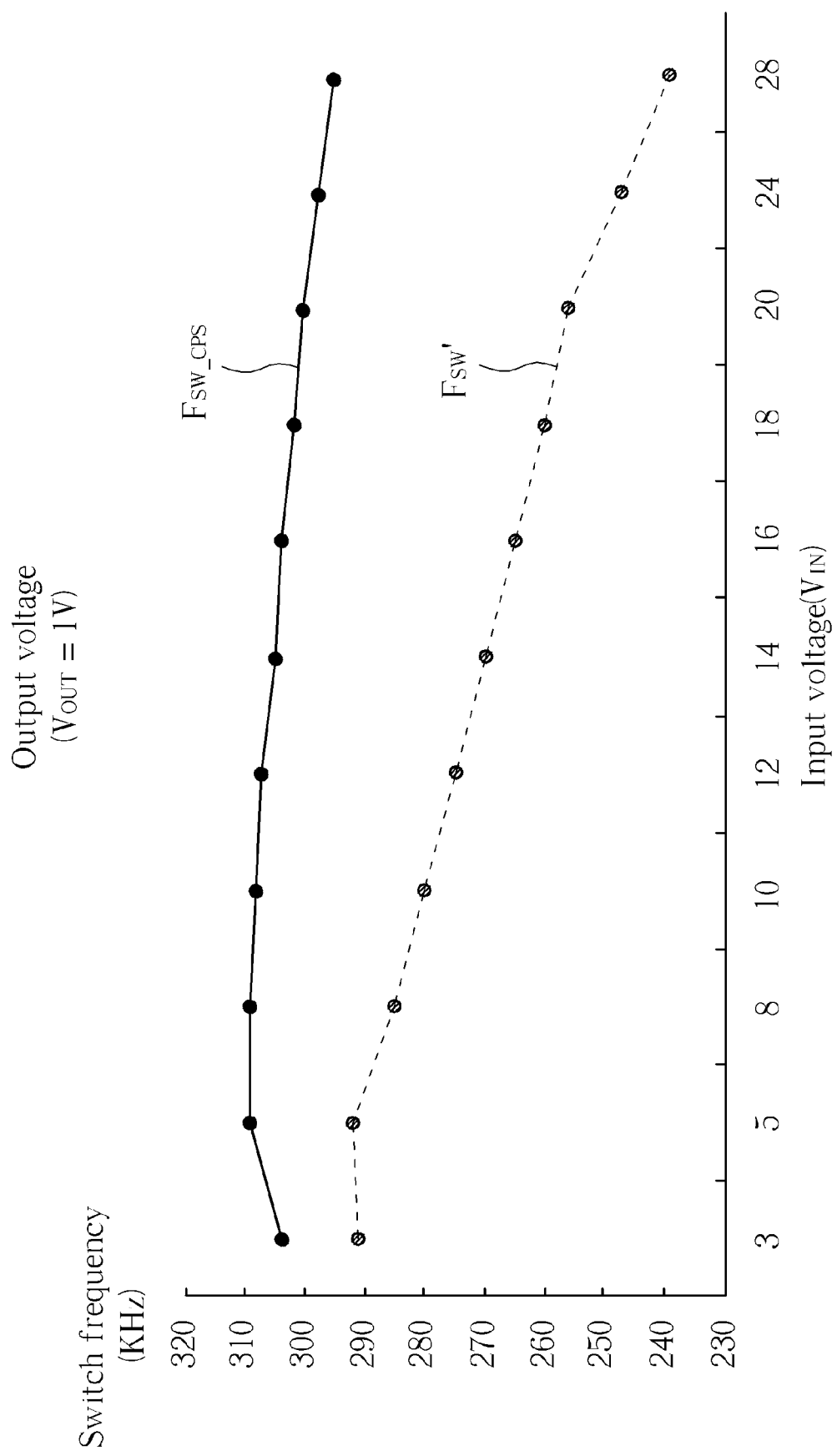
FIG. 7 is a switch frequency-input voltage diagram of the buck converter with/without delay compensation.

Please refer to FIG. 7, which is a schematic diagram of the switch frequency versus the input voltage of the buck converter 10 with/without delay compensation. In FIG. 7, the output voltage $V_{OUT}$ of the buck converter 10 is set to be 1 Volt, the switch frequency $F_{SW\_CPS}$ with delay compensation is denoted with a solid line, the switch frequency $F_{SW}'$ without delay compensation is denoted with a doted line. As shown in FIG. 7, the switch frequency $F_{SW}'$ decreases as the input voltage $V_{IN}$ increases, when the input voltage $V_{IN}$ increases from 3 Volts to 28 Volts, the switch frequency $F_{SW}'$ varies about 290-240 kHz and decreases about 17.24%. In other words, the lower the duty cycle D, i.e.

$$\frac{V_{OUT}}{V_{IN}},$$

the higher percentage the delay time $\Delta T$ of the turn-on time $T_{ON}'$, and the more significant influence on the switch frequency $F_{SW}'$. In comparison, the switch frequency $F_{SW\_CPS}$ with delay compensation is hardly influenced by the input voltage $V_{IN}$, when the input voltage $V_{IN}$ increases from 3 Volts to 28 Volts, the switch frequency $F_{SW\_CPS}$ varies about 310-300 kHz and decreases about 3.33%. As a result, the problem of the duty cycle D influencing the switch frequency may be improved.

To sum up, the present invention is to improve the problem of the delay time $\Delta T$ of the high-side switch HS causing the switch frequency $F_{SW}'$ varying as the duty cycle D varies. By increasing a start-voltage of the set turn-on signal $S_{TONSET}$, the set turn-on signal $S_{TONSET}$ may reach the reference voltage $V_{K\_OUT}$ in advance to compensate for the delay time $\Delta T$ of the high-side switch HS. As a result, no matter whether the buck converter 10 operates in a high or low duty cycle, the switch frequency of the buck converter may keep stable to provide a stable power efficiency to the load, and thus a range of application of the buck converter 10 may be broadened.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A COT (Constant-On-Time) generation circuit for generating a turn-on signal to a buck converter for converting an input voltage to an output voltage, comprising:
   a capacitor;
   a current source having a transfer impedance and coupled to a first voltage for generating a current according to a first resistance of the transfer impedance and the first voltage;
   a second resistor coupled between the capacitor and the current source;
   an inverter coupled to a first front-end driver signal of the buck converter for inverting the first front-end driver signal;
   a transistor including a drain coupled to the capacitor, a source coupled to a ground terminal and a gate, for receiving the inverted first front-end driver signal to trigger the current source charging the capacitor so as to generate a set turn-on signal;
   a comparator including a negative input terminal coupled to a reference voltage, a positive input terminal coupled to the second resistor and the current source, and an output terminal, for comparing the reference voltage with the set turn-on signal to output a comparison result; and
   an SR-latch including a reset input terminal coupled to the output terminal of the comparator, and a set input terminal coupled to a trigger signal of the buck converter, for outputting a turn-on signal to a driver stage circuit of the buck converter according to the trigger signal and the comparison result.

2. The COT generation circuit of claim 1, further comprising a voltage adjustment unit coupled between the output voltage of the buck converter and the negative input terminal of the comparator for generating the reference voltage, wherein the voltage adjustment unit has an adjustment constant, and the reference voltage is equal to a product of the output voltage and the adjustment constant.

3. The COT generation circuit of claim 1, wherein when the trigger signal triggers the current source to charge the capacitor, the current flows through the second resistor to generate a cross voltage on the second resistor.

4. The COT generation circuit of claim 3, wherein when the trigger signal triggers the current source to charge the capacitor, a voltage of the set turn-on signal starts increasing from the cross voltage.

5. The COT generation circuit of claim 3, wherein when the set turn-on signal is less than the reference voltage, the turn-on signal of the comparator output is at a low voltage for turning on a high-side switch, wherein a second turn-on time of the high-side switch is equal to a sum of a first turn-on time of the turn-on signal and a delay time.

6. The COT generation circuit of claim 5, wherein the delay time is equal to a product of a second resistance of the second resistor and a capacitance of the capacitor.

7. The COT generation circuit of claim 5, wherein the first turn-on time is equal to a product of the first resistance, the capacitance and the reference voltage divided by the input voltage.

8. The COT generation circuit of claim 1, wherein the first voltage is equal to the input voltage or the voltage of a phase signal of the buck converter.

9. A buck converter for converting an input voltage to an output voltage, comprising:
   a trigger signal generation circuit for outputting a trigger signal;
   a COT (Constant-On-Time) generation circuit, comprising:
   a capacitor;
   a current source having a transfer impedance and coupled to a first voltage for generating a current according to a first resistance of the transfer impedance and the first voltage;
   a second resistor coupled between the capacitor and the current source;
   an inverter coupled to a first front-end driver signal of the buck converter for inverting the first front-end driver signal;
   a transistor including a drain coupled to the capacitor, a source coupled to a ground terminal and a gate for receiving the inverted first front-end driver signal to trigger the current source charging the capacitor so as to generate a set turn-on signal;
   a comparator including a negative input terminal coupled to a reference voltage, a positive input terminal coupled to the second resistor and the current source, and an output terminal for comparing the reference voltage with the set turn-on signal to output a comparison result; and
   an SR-latch including a reset input terminal coupled to the output terminal of the comparator and a set input terminal coupled to the trigger signal, and an output terminal for outputting a turn-on signal to a driver stage circuit of the buck converter according to the trigger signal and the comparison result;
   a driver stage circuit coupled to the output terminal of the SR-latch for generating a phase signal according to the turn-on signal; and
   an output stage circuit for generating the output voltage to an output load according to the phase signal.

10. The buck converter of claim 9, wherein the trigger signal generation circuit comprises:
    a first resistor coupled to the output voltage;
    a second resistor coupled between the first resistor and the ground terminal;
    a comparator including a negative input terminal coupled to the first resistor and the second resistor, a positive input terminal coupled to a trigger reference signal, and an output terminal for outputting the trigger signal according to the feedback voltage and the trigger reference signal.

11. The buck converter of claim 9, wherein the driver stage circuit comprises:
    a first front-end driver including an input terminal coupled to the turn-on signal outputted by the COT generation circuit, and an output terminal for generating the first front-end driver signal according to the turn-on signal;
    a high-side switch including a drain coupled to the input voltage, a gate coupled to the output terminal of the first front-end driver, and a source for turning on or off the high-side switch according to the first front-end driver signal to generate the phase signal;
    a second front-end driver including an input terminal coupled to the turn-on signal outputted by the COT generation circuit, and an output terminal for generating a second front-end driver signal according to the turn-on signal; and
    a low-side switch including a drain coupled to the input voltage, a gate coupled to the output terminal of the second front-end driver, and a source for turning on or off the low-side switch according to the second front-end driver signal.

12. The buck converter of claim 9, further comprising a bootstrap circuit, wherein the bootstrap circuit comprises:
   a diode including an anode coupled to a operating bias of the second front-end driver, a cathode coupled to a bootstrap voltage of the first front-end driver; and
   a bootstrap capacitor having a terminal coupled to the source of the high-side switch and the drain of the low-side switch, and another terminal coupled to the bootstrap voltage.

13. The buck converter of claim 9, wherein the output stage circuit comprises:
   an effective serial resistor;
   an output capacitor coupled between the effective serial resistor and the ground terminal;
   an output inductor coupled between the bootstrap capacitor and the effective serial resistor for generating the output voltage to the output load according to the phase signal.

14. The buck converter of claim 9, further comprising a voltage adjustment unit coupled between the output voltage and the positive input terminal of the comparator for generating the reference voltage, wherein the voltage adjustment unit has an adjustment constant, the reference voltage is equal to a product of the output voltage and the adjustment constant.

15. The buck converter of claim 9, wherein when the trigger signal triggers the current source to charge the capacitor, the current flows through the second resistor to generate a cross voltage on the second resistor.

16. The buck converter of claim 15, wherein when the trigger signal triggers the current source to charge the capacitor, a voltage of the set turn-on signal begins increasing from the cross voltage.

17. The buck converter of claim 15, wherein when the set turn-on signal is less than the output voltage, the turn-on signal outputted by the comparator output is at a high voltage for turning on the high-side switch, wherein a second turn-on time of the high-side switch is equal to a sum of a first turn-on time of the turn-on signal and a delay time.

18. The buck converter of claim 17, wherein the delay time is equal to a product of a second resistance of the second resistor and a capacitance of the capacitor.

19. The buck converter of claim 17, wherein the first turn-on time is equal to a product of the first resistance, the capacitance and the reference voltage divided by the input voltage.

20. The buck converter of claim 9, wherein the first voltage is equal to the input voltage or a voltage of the phase signal of the driver stage circuit.

* * * * *